(12) United States Patent
Sun et al.

(10) Patent No.: US 10,514,233 B2
(45) Date of Patent: Dec. 24, 2019

(54) LED LIGHT SOURCE CAPABLE OF PROJECTING GRAPHIC LOGO AND RED DOT SIGHT THEREOF

(71) Applicants: Huanic Corporation, Xi'an, Shaanxi (CN); Jianhua Sun, Xi'an (CN)

(72) Inventors: Jianhua Sun, Xi'an (CN); Zhiqiang Hao, Xi'an (CN)

(73) Assignee: Huanic Corporation, Xi'an, Shaanxi (CN)

( * ) Notice: Subject to any disclaimer, the term of this patent is extended or adjusted under 35 U.S.C. 154(b) by 112 days.

(21) Appl. No.: 15/544,466

(22) PCT Filed: Apr. 13, 2015

(86) PCT No.: PCT/CN2015/076499
§ 371 (c)(1),
(2) Date: Jul. 18, 2017

(87) PCT Pub. No.: WO2016/112592
PCT Pub. Date: Jul. 21, 2016

(65) Prior Publication Data
US 2017/0363387 A1 Dec. 21, 2017

(30) Foreign Application Priority Data

Jan. 18, 2015 (CN) .................. 2015 2 0031277 U
Jan. 18, 2015 (CN) .................. 2015 2 0032865 U
(Continued)

(51) Int. Cl.
*F41G 1/34* (2006.01)
*F41G 11/00* (2006.01)
(Continued)

(52) U.S. Cl.
CPC .............. *F41G 1/345* (2013.01); *F41G 1/34* (2013.01); *F41G 1/35* (2013.01); *F41G 1/383* (2013.01);
(Continued)

(58) Field of Classification Search
CPC .......... F41G 11/003; F41G 1/345; F41G 1/30; F41G 1/35; F41G 11/004; F41G 1/34;
(Continued)

(56) References Cited

U.S. PATENT DOCUMENTS 8,769,859 B2    7/2014  Li et al.
9,982,965 B2 *  5/2018  Sun ........................ F41G 1/30
(Continued)

FOREIGN PATENT DOCUMENTS

CN    103868410 A    6/2014
CN    203785547 U    8/2014
(Continued)

OTHER PUBLICATIONS

Extended European Search Report—Application No. 15877510.6—dated Nov. 7, 2018.

*Primary Examiner* — Yaritza Guadalupe-McCall
(74) *Attorney, Agent, or Firm* — Amster, Rothstein & Ebenstein LLP

(57) ABSTRACT

An LED light source capable of projecting a set graphic logo and a red dot sight thereof, comprising a point light source (1) and a peripheral light source (2) around the point light source (1), the peripheral light source (2) being discontinuous line light source. The LED light source capable of projecting the set graphic logo does not need a raster being matched with transmission to obtain an LED with luminous set graphic logo, so that the power consumption is reduced, system design is simplified, product functions are increased,
(Continued)

and simplification of structure, convenience of operation and reduction of cost for red dot sight are facilitated.

20 Claims, 10 Drawing Sheets

(30) Foreign Application Priority Data

| | | |
|---|---|---|
| Apr. 2, 2015 | (CN) | 2015 2 0195181 U |
| Apr. 2, 2015 | (CN) | 2015 2 0195264 U |
| Apr. 2, 2015 | (CN) | 2015 2 0195632 U |

(51) Int. Cl.
| | |
|---|---|
| *F41G 1/35* | (2006.01) |
| *G02B 27/32* | (2006.01) |
| *H02S 10/40* | (2014.01) |
| *H02S 40/38* | (2014.01) |
| *G02B 27/34* | (2006.01) |
| *F41G 1/38* | (2006.01) |

(52) U.S. Cl.
CPC .......... *F41G 11/004* (2013.01); *G02B 27/32* (2013.01); *G02B 27/34* (2013.01); *H02S 10/40* (2014.12); *H02S 40/38* (2014.12)

(58) Field of Classification Search
CPC . F41G 1/383; F41G 1/54; F41G 1/545; F41G 3/323; G02B 19/0023; G02B 19/0052
USPC .......................................................... 33/299
See application file for complete search history.

(56) References Cited

U.S. PATENT DOCUMENTS

| | | | |
|---|---|---|---|
| 10,042,243 B1* | 8/2018 | Metayer | G03B 29/00 |
| 2002/0078618 A1 | 6/2002 | Gaber | |
| 2007/0068018 A1* | 3/2007 | Gilmore | F41G 1/345 33/265 |
| 2007/0122147 A1* | 5/2007 | Hung | G02B 27/0006 396/535 |
| 2008/0186584 A1 | 8/2008 | Ballard | |
| 2012/0092628 A1* | 4/2012 | Takahashi | G03B 21/14 353/82 |
| 2013/0283661 A1 | 10/2013 | Lynn et al. | |
| 2014/0071535 A1 | 3/2014 | Geraci | |
| 2014/0305022 A1 | 10/2014 | Chung | |
| 2014/0360082 A1 | 12/2014 | Tsai et al. | |
| 2015/0185594 A1* | 7/2015 | Chen | G03B 21/145 353/52 |
| 2017/0038177 A1* | 2/2017 | Sun | F41G 1/30 |
| 2017/0363387 A1* | 12/2017 | Sun | F41G 1/35 |
| 2018/0292168 A1* | 10/2018 | Borrico | F41G 1/30 |

FOREIGN PATENT DOCUMENTS

| | | |
|---|---|---|
| CN | 204064119 U | 12/2014 |
| DE | 8800656 U1 | 3/1988 |
| WO | 9529377 | 11/1995 |

* cited by examiner

LED LIGHT SOURCE CAPABLE OF PROJECTING GRAPHIC LOGO AND RED DOT SIGHT THEREOF

CROSS REFERENCE TO RELATED APPLICATION

This application is a US national phase of International Application No. PCT/CN2015/076499 filed Apr. 13, 2015, which claims priority to Chinese Patent Applications No. 201520032865.6 and No. 201520031277.0 filed on Jan. 18, 2015, and No. 201520195264.7, No. 201520195632.8 and No. 201520195181.8 filed on Apr. 2, 2015, the entire contents of which are incorporated herein by reference.

TECHNICAL FIELD

The present disclosure belongs to the field of photoelectric technologies, and more particularly, to an LED light source capable of projecting a graphic logo and a red dot sight thereof.

BACKGROUND

An existing LED point light source can only emit a point light spot with a single transmission shape. Typically, the transmitted light spot is of a nearly circular shape, or is of an oval shape as required. No matter whatever specific shape of a light spot is needed, this depends mainly on a cross-section shape of an exit pupil manufactured on the LED light source. In other words, light generally forms the light spot transmitted to a surface of an illuminated object after being intercepted via the pupil. Therefore, the shape of the transmitted light spot is determined by the cross-section shape of the pupil.

Nowadays, a large number of the light sources used on a red dot sight generally are LED point light sources, and the light spot transmitted generally is of the circular shape or the oval shape. However, to produce two light spots of different shapes, for example, to produce a round light spot outside a circular light spot, a general practice at present is to use a raster, thereby implementing interception of a cross section of the light spot emitted from an LED surface light source and transmitting the light spot with a specific form because of the interception of the raster. However, with the use of the LED surface light source, a lot of power is wasted due to use of the LED surface light source. Furthermore, only one of the circular light spot and the light spot with a specific shape produced due to a raster effect, rather than both of them, can be used at a time. If they are used simultaneously, an extra light path system is needed, which may make the whole light path complex. Particularly when only one light spot with a specific shape is needed, complexity of operation may be increased, and reliability of the sight is reduced.

Most of the existing red dot sights use batteries. For example, a lithium battery can provide electric energy required by the operation of a red dot module. The batteries have limited service lifetime and need to be replaced, so that use cost is increased. Furthermore, in the process of using, due to the change of illumination of external environment, supplied current or voltage of the batteries needs to be adjusted by means of a regulating switch so as to implement adjustment of the brightness of an output light of the red dot module. For example, when the environment brightness is enhanced, the brightness of the output light of the red dot module needs to be increased. Otherwise, the brightness of the output light of the red dot module needs to be decreased. Such red dot sight relies on batteries to supply power no matter in the day or at night. Consequently, replacement of the batteries increases the use cost.

For the existing red dot sight, a dustproof cover is generally provided at the exit pupil. Opening or closing the dustproof cover is implemented by upside down of a coupling pin. Opening degree completely depends on an extent that a cover plate is opened by manpower. The cover plate cannot be opened quickly at one go. The cover plate may need to be opened twice and even thrice because the cover plate may be not opened in place once. In this process, fingers may touch other parts, thereby producing vibration, which is not beneficial to stable adjustment of the sight.

Additionally, unlocking an existing installation card track generally is implemented by drawing a lock catch to a trigger portion of a cam handle. Improper force direction cannot effectively apply human power to the lock catch sufficiently. As a result, opening the lock catch needs larger strength and proper angle, and thus the operation is not quickly enough.

The foregoing information is merely disclosed to facilitate understanding of background of the present disclosure. Therefore, the foregoing information may include information not constituting the prior art known to those of ordinary skill in the art.

SUMMARY

The utility model aims at overcoming a problem that the existing LED point light source only can generate round or oval light spots, and cannot generate specifically required light spots unless under the cooperation of other optical devices, which causes a problem of complicated system and complex operation;

overcoming a problem that the existing red dot sight merely relies on a battery to supply electric energy, which causes a problem of high use cost; and overcoming a deficiency that a dustproof cover on the existing red dot sight cannot be quickly and properly opened and cannot implement a rotation of 360° and a problem that an installation card track is not quick in operation.

In order to achieve the above objects, the utility model provides an LED light source capable of projecting a graphic logo, including a point light source (1) and a peripheral light source around the point light source (1), where the peripheral light source (2) is a discontinuous line light source.

A radial cross section of the peripheral light source (2) is ring-shaped.

Along a circumferential direction of the peripheral light source (2) there are uniformly provided with four strip light sources (5) extending from an inner side edge (3) of the peripheral light source to an outer side edge (4) of the peripheral light source.

At a bottom of the peripheral light source (2) there is provided with a notch (6) symmetrical with respect to a diameter in a vertical direction, at a bottom of the notch (6) there is provided with a horizontal segment (8) symmetrical with respect to a diameter in the vertical direction, wherein a left side and a right side of the horizontal segment (8) intersect with extension lines of segmental arcs (7) at two sides of the notch (6).

A bottom strip light source (9), among the strip light sources (5), placed at the bottom of the peripheral light source (2) is perpendicular to the horizontal segment (8) and bisects the horizontal segment (8).

On the horizontal segment (8), a left side and a right side of the bottom strip light source (9) are respectively provided with at least two light emitting bars (10) perpendicular to the horizontal segment (8).

A plurality of the point light sources (1) are placed vertically downward and uniformly from a center of the peripheral light source (2), and the plurality of the point light sources may be respectively lit or simultaneously lit.

The point light sources (1) and the peripheral light source (2) are placed on a same radial plane.

A red dot sight including the LED light source includes a housing (11), a red dot module placed in or on the housing (11), a battery placed in the housing (11), a brightness regulating switch placed on the housing (11), and a circuit board placed in the housing (11) to control a voltage or current of the red dot module. The battery is connected to the red dot module via the brightness regulating switch. The red dot sight further includes a solar cell (12) placed on the housing (11), wherein a power output terminal of the solar cell (12) is connected to a power input terminal of the red dot module.

The LED light source is installed in the red dot module to provide a light source.

The circuit board is provided with a micro control unit (MCU) and a gear control circuit.

The solar cell (12) is connected in series to the red dot module via the MCU, and the battery is connected in series to the red dot module via the MCU and the gear control circuit.

As a press button switch, the brightness regulating switch includes a "+" button and a "−" button, which are respectively connected to the MCU.

The MCU cuts off an electrical connection between the solar cell (12) and the red dot module according to an initial input signal of either one of the "+" button and the "−" button, and controls the gear control circuit according to second or multiple input signals of either one of the "+" button and the "−" button to implement regulation of the voltage or current of the red dot module and change the brightness of output light of the red dot module. Also, The MCU cuts off an electrical connection between the battery and the gear control circuit according to a signal simultaneously inputted via the "+" button and the "−" button or no arbitrary input signal being inputted within a period of time, and simultaneously recovers the electrical connection between the solar cell (12) and the red dot module.

The solar cell (12) is pit mounted on a top surface of the housing (11), and a top surface of the solar cell (12) is provided with protective glass.

There are at least two solar cells (12), and a length direction thereof is parallel to that of the housing (11).

The solar cell (12) is any one of monocrystalline silicon, polycrystalline silicon, silicon photodiode or weak light type amorphous silicon solar cells A red dot sight including the LED light source includes a core housing (25) whose front end external surface is a spherical surface, a red dot module mounted in the inner core housing (25), a spherical clamping ring (26) mounted at a front end front side of the inner core housing (25) to limit the front end, characterized in that the LED light source is mounted in the red dot module to provide a light source.

An external surface at the front end of the inner core housing (25) is provided with a limit pin (27), and the limit pin (27) extends outward parallel to a radial direction along an extension line of a spherical center line of the front end.

A rear side of a front end of the inner core housing (25) is provided with an annular fixed base (28) whose internal surface is a spherical surface fitting to a surface of the rear side of the front end. An edge at the front end of the annular fixed base (28) is provided with a U-shaped notch (29) extending inward from the front end edge so that the limit pin (27) is inserted into the U-shaped notch (29) to limit the inner core housing (25).

A red dot sight including the LED light source includes a dustproof cover placed on a light outlet hole on the housing, including an annular front cover (30), an annular base (32) threadedly coupled to one end of the annular front cover (30), and a cover plate (33) coupled to an ear hole (36) on the annular base (32) through a core shaft (34). A washer (31) is provided between the annular front cover (30) and the annular base (32), characterized in that the cover plate (33) is coupled to the ear hole (36) through a support bar (37).

The support bar (37) includes a connecting pipe (38) and a connecting rod (39) coupled to the annular base (32), a first return spring (40) and a second return spring (41) sleeved on the connecting rod (39), and a first clamp spring (42) and a second clamp spring (43).

One end of the connecting rod (39) is fixedly connected to a circumferential central portion of the connecting pipe (38).

The connecting rod (39) is provided with a central annular groove (44) positioned at an axial central portion of the connecting rod (39) and an end annular groove (45) placed at the other end of the connecting rod (39).

A first fixing ring (67), a second fixing ring (46) and a third fixing ring (47) are placed on an internal surface of the cover plate (33) along the same diameter direction of a circle sharing the same plane with the cover plate (33).

The second fixing ring (46) is placed at a middle position between the first fixing ring (67) and the third fixing ring (47).

On the internal surface of the cover plate (33), a first rectangular groove (48) and a second rectangular groove (49) are placed at a side where the second fixing ring (46) and the third fixing ring (47) face toward the first fixing ring (45).

The connecting rod (39) successively passes through the first fixing ring (67), the second fixing ring (46) and the third fixing ring (47). The first return spring (40) is placed between the first fixing ring (67) and the second fixing ring (46), and the second return spring (41) is placed between the second fixing ring (46) and the third fixing ring (47).

One end of the first clamp spring (42) and of the second clamp spring (43) is respectively inserted into the central annular groove (44) and the end annular groove (45), and the other end thereof is respectively inserted into the first rectangular groove (48) and the second rectangular groove (49), so that the first return spring (40) and the second return spring (41) compressed under the action of external forces restore a static length after the external forces disappear, and meanwhile the connecting pipe (38) tightly presses on an end face of the cover plate (33).

On the connecting pipe (38), either side of the connecting rod (39) is provided with a clamping piece (50), the end face of the cover plate (33) is provided with a limit groove (51) fitting in with the clamping piece (50) for limiting.

The connecting pipe (38) is internally provided with a torsion spring (35), and the core shaft (34) passes through the torsion spring (35).

The connecting pipe (38) is provided with an axial opening (52) so that a tail end (53) of the torsion spring (35) extends to outside the connecting pipe (38) and presses against the ear hole (36) to produce a force to open the cover plate (33).

The opening (52) is placed at a rear side of the clamping piece (50). The opening (52) and an axle of the connecting rod (39) are respectively placed on two sides of the clamping piece.

The internal surface of the cover plate (33) is provided with an annular retainer ring (53). The first fixing ring (67) and the second fixing ring (46) are respectively embedded into the annular retainer ring (53). The internal surface of the cover plate (33) is further provided with a sealing cap (54) threadedly coupled to the annular retainer ring (53). A position, corresponding to the first fixing ring (67), on the sealing cap (54) is provided with a notch (55) into which the connecting rod (39) can be inserted.

An embedded honeycomb seal threadedly coupled to the annular base (32) is further included. The honeycomb seal and the annular front cover (30) are respectively placed at two axial ends of the annular base (32).

The honeycomb seal includes a circular honeycomb network (56), an annular honeycomb network housing (57) and an annular clamping ring (58). An internal surface of the annular honeycomb network housing (57) is provided with an annular flange. The circular honeycomb network (56) is embedded into the annular honeycomb network housing (57), and is fixed to the annular honeycomb network housing (57) via the annular flange and the annular clamping ring (58) threadedly coupled to the annular honeycomb network housing (57).

The internal surface of the cover plate (33) is provided with an annular retainer ring (53). The first fixing ring (67) and the second fixing ring (46) are respectively embedded into the annular retainer ring (53). The internal surface of the cover plate (33) is further provided with a sealing cap (54) threadedly coupled to the annular retainer ring (53). A position, corresponding to the first fixing ring (67), on the sealing cap (54) is provided with a notch (55) into which the connecting rod (39) can be inserted.

An installation card track mounted in the red dot sight includes a base (68), a cam handle (69) mounted at one lateral surface of the base, and a locking mechanism fixing the cam handle (69), characterized in that the locking mechanism includes a card track portion (70), a sliding lock catch (61) clamped into the card track portion (70) and a lock catch return spring (62).

The card track portion (70) is placed at a rear end of the base (68), and a parallel track opening (59) of the card track portion (70) is parallel to a lateral surface of the base (68).

The sliding lock catch (61) includes a straight connecting portion (67) parallel to a bottom surface of the card track portion (70), an internally vertical portion (63) and an externally vertical portion (64) perpendicular to the bottom surface of the card track portion (70).

The internally vertical portion (63) and the externally vertical portion (64) are respectively connected to two ends of the straight connecting portion (67).

The lock catch return spring (62) is placed in space surrounded by the externally vertical portion (64), a lateral surface and the bottom surface of the card track portion (70) and the straight connecting portion (67), and the lock catch return spring (62) is axially parallel to the lateral surface of the base (68).

An outer side edge at the top of the internally vertical portion (63) is provided with an arc-shaped guide surface, and a rear end edge of the arc-shaped guide surface extends to the externally vertical portion (64) to form a hook portion so that a locking notch (65) on the cam handle (69) can be inserted or drawn out to implement or relieve limit and fixation of the cam handle (69).

The internally vertical portion (63) is vertically fixed to the straight connecting portion (67) by a pin bolt (66).

One side, of the red dot sight, in an axial direction is provided with an extractable battery compartment (71) and a battery bracket (72) in conjunction with the extractable battery compartment (71) for use, wherein the battery bracket (72) includes a push-pull block (73) and a support member (74) fixedly connected to an inner side surface of the push-pull block (73).

The support member (74) consists of a left supporting rod and a right supporting rod which are placed symmetrically and whose internal surfaces butt and connect into an integral arc-shaped surface. Free ends of the left supporting rod and the right supporting rod are provided with a projection (75) whose internal surface is an arc-shaped surface, wherein the projection (75) extends inwardly, perpendicular/parallel to the push-pull block (73), to form an annular clamping portion for clamping the notch of the battery (76).

The top of the push-pull block (73) is provided with a groove (77) for drawing the battery bracket (72) from the battery compartment (71).

Left and right edges of the push-pull block (73) respectively extend leftward and rightward, and the extending portions are respectively provided with a screw hole (78) threadedly connected to the red dot sight.

The utility model has the following advantages.

1. The LED light source capable of projecting a graphic logo does not need a raster being matched with transmission to obtain a set LED with luminous graphic logo, so that power consumption is reduced, system design is simplified, and product functions are increased.

2. The solar cell is used to supply electric energy for the red dot module, so that the red dot sight automatically adjusts the brightness of the output light of the red dot module as the environment brightness changes without relying on any control circuit. Furthermore, the red dot module does not need to be supplied with power by a battery. Therefore, the service life of the cell is prolonged and the use cost is reduced. In combination with a battery power supply system of the red dot sight, it is ensured that the red dot sight can be used normally at night.

3. Adjustment of the inner core housing may not cause a circumferential rotation of the LED light source capable of projecting a graphic logo, so that emergent light is stable.

4. The dustproof cover can be rotated at 360° and the cover can be opened quickly and completely, and no misoperation such as vibration or unintended touch to the lens may be performed on sighting.

The utility model will be described below with reference to the accompanying drawings and embodiments.

BRIEF DESCRIPTION OF THE DRAWINGS

By referring to detailed description of the drawings and exemplary embodiments, the foregoing and other characteristics and advantages of the present disclosure will become more apparent.

DETAILED DESCRIPTION

Figure 1:
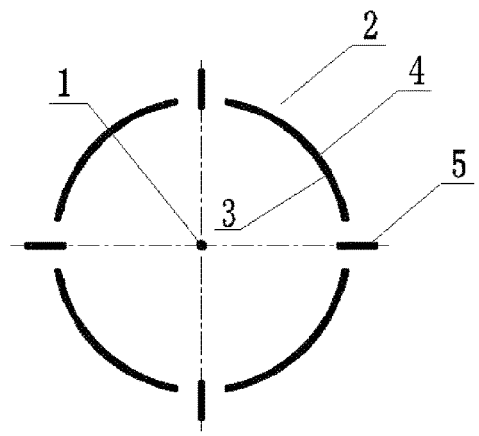
FIG. 1 is a diagrammatic end view of an LED light source capable of projecting a set graphic logo according to Embodiment I.

To overcome a problem that the existing LED point light source generally adopted by a red dot sight only can generate round or oval light spots, and cannot generate specifically required light spots unless under the cooperation of other optical devices, which causes a problem of complicated system and complex operation. This embodiment provides an LED light source capable of projecting a graphic logo as shown in FIG. 1, which includes a point light source 1 and a peripheral light source around the point light source 1, wherein the peripheral light source 2 is a discontinuous line light source, and the specific shape of this line light source can be set as needed, such as circle, semicircle, semi-ring or cross. Thus, a preset light spot having a required shape can be produced by lightening the peripheral light source 2, which does not need a matched raster to shield the existing point light source, thereby saving parts and simplifying structures.

A radial cross section of the peripheral light source 2 provided by this embodiment is ring-shaped.

To provide a better reference to the sight, in this embodiment, a target image used for a general sight is imitated. As can be known from FIG. 1, in this embodiment, particularly a circumference of the peripheral light source 2 is uniformly provided with four strip light sources 5 extending from an inner side edge 3 of the peripheral light source to an outer side edge 4 of the peripheral light source.

Figure 2:
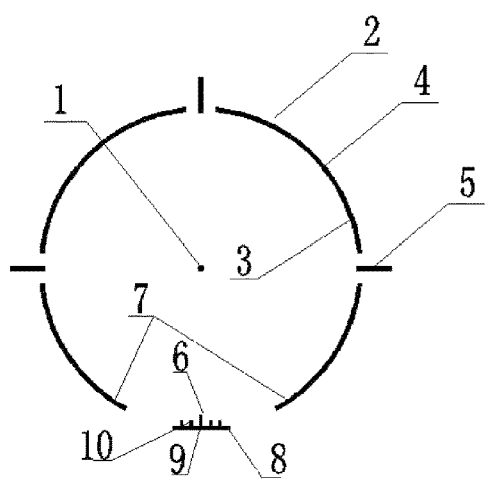
FIG. 2 is a diagrammatic end view of an LED light source whose bottom is provided with a notch symmetrical with respect to a diameter in a vertical direction.

As can be seen from FIG. 2, a bottom of the peripheral light source 2 is provided with a notch 6 symmetrical with respect to a diameter in a vertical direction, at a bottom of the notch 6 there is provided with a horizontal segment 8 symmetrical with respect to a diameter in the vertical direction, wherein a left side and a right side of the horizontal segment 8 intersect with extension lines of segmental arcs 7 at two sides of the notch 6. A bottom strip light source 9, among the strip light sources 5, placed at the bottom of the peripheral light source 2 is perpendicular to the horizontal segment 8 and bisects the horizontal segment 8. On the horizontal segment 8, a left side and a right side of the bottom strip light source 9 are respectively provided with at least two light emitting bars 10 perpendicular to the horizontal segment 8.

Figure 3:
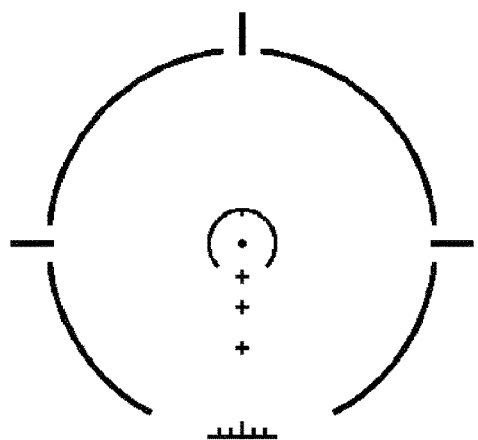
FIG. 3 is a diagrammatic end view of an LED light source capable of projecting a set graphic logo provided with a plurality of point light sources.

As can be seen from FIG. 3, a plurality of the point light sources 1 are placed vertically downward and uniformly from a center of the peripheral light source 2, and the plurality of the point light sources may be respectively lit or simultaneously lit. In this way, a combination type LED light source of a judgeable shooting distance may be generated by combined use of the plurality of the point light sources.

The point light sources 1 and the peripheral light source 2 are placed on the same radial plane.

In conclusion, the LED light source capable of projecting the set graphic logo provided by this embodiment does not need a raster being matched with transmission to obtain a set LED with luminous graphic logo, so that the power consumption is reduced, system design is simplified, product functions are increased, and simplification of structure, convenience of operation and reduction of cost for the red dot sight are facilitated.

Figure 12A:
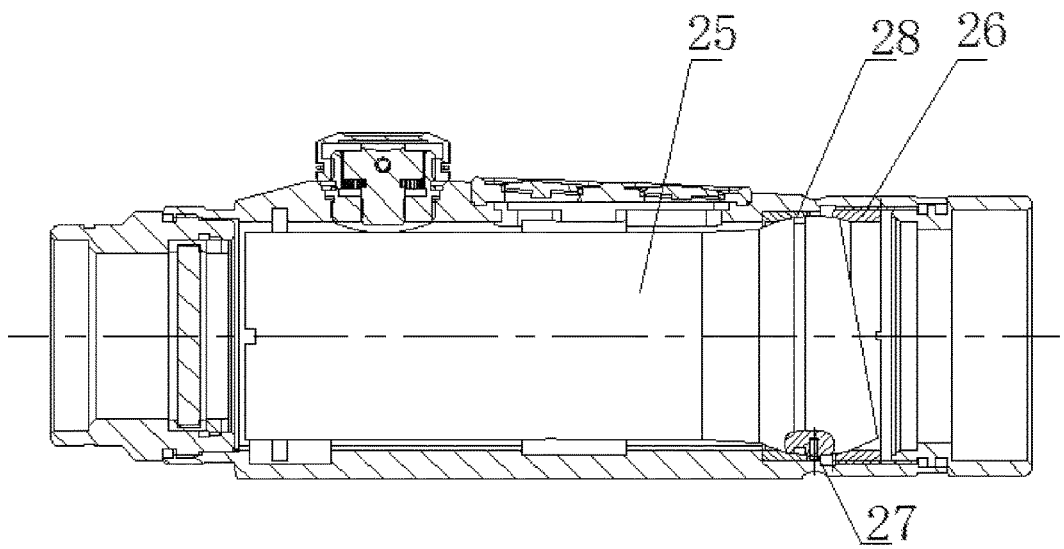
FIG. 12A is an axial sectional view of a red dot sight.
Figure 12B:
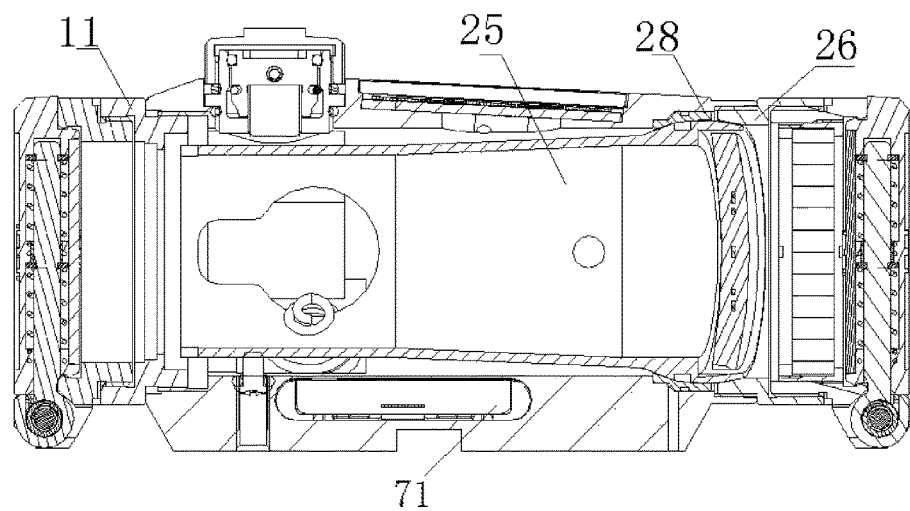
FIG. 12B is an axial sectional view of a red dot sight having a solar cell.
Figure 13:
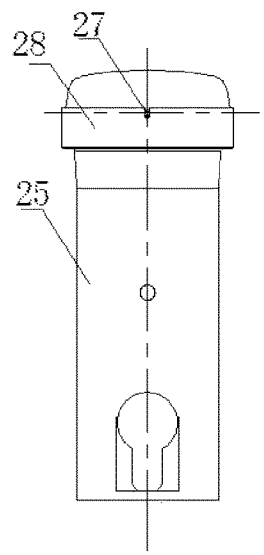
FIG. 13 is a schematic diagram of an inner core housing externally provided with an annular fixed base.
Figure 14:
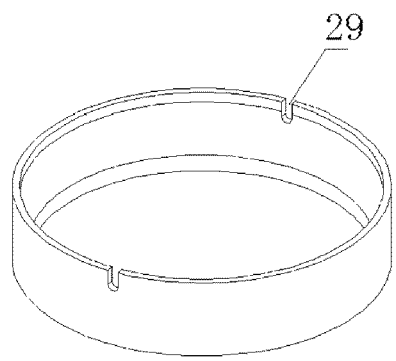
FIG. 14 is a schematic diagram of the annular fixed base.

As shown in FIGS. 12A, 12B and 13, a red dot sight including the LED light source capable of projecting the set graphic logo includes an inner core housing 25 whose front end external surface is a spherical surface, a red dot module mounted in the inner core housing 25, and a spherical clamping ring 26 mounted at a front end front side of the inner core housing 25 to limit the front end. The LED light source is mounted in the red dot module to provide a light source. An external surface at the front end of the inner core housing 25 is provided with a limit pin 27, and the limit pin 27 extends outward parallel to a radial direction along an extension line of a spherical center line of the front end. A rear side of a front end of the inner core housing 25 is provided with an annular fixed base 28 whose internal surface is a spherical surface fitting to a surface of the rear side of the front end. An edge at the front end of the annular fixed base 28 is provided with a U-shaped notch 29 extending inward from the front end edge so that the limit pin 27 is inserted into the U-shaped notch 29 to limit the inner core housing 25. In this way, it is ensured that a sight logo in the LED light source capable of projecting the graphic logo does not generate axial rotation in the process of adjusting a light emitting direction in the process of adjusting horizontal and vertical angles of the inner core housing 25. Therefore, the stability of the LED light source capable of projecting the graphic logo is improved, and a problem that the sight logo in the LED light source capable of projecting the graphic logo generates axial rotation due to a fact that adjustment of the traditional inner core housing may generate a rotation due to its own.

Figure 4A:
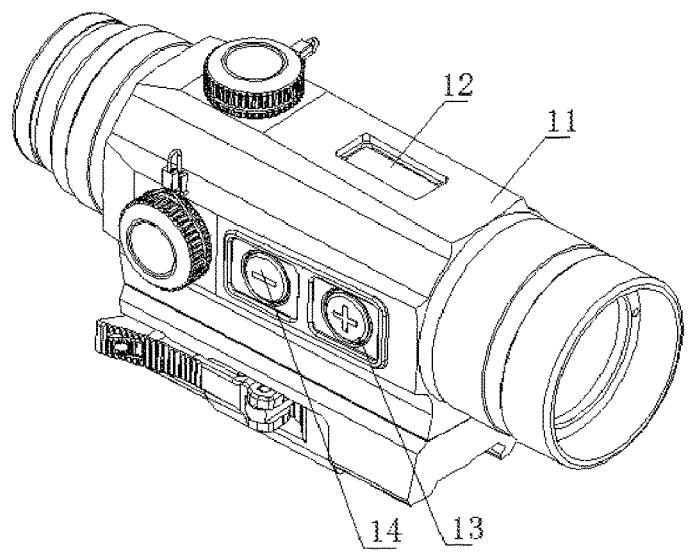
FIG. 4A is a schematic diagram of a battery-powered solar red dot sight according to an embodiment of the utility model.
Figure 4B:
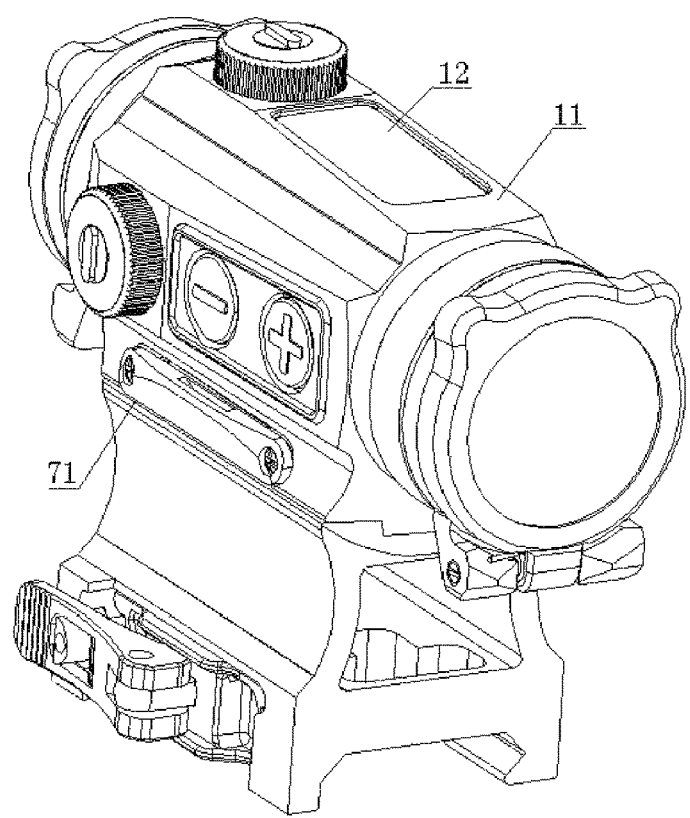
FIG. 4B is a three-dimensional schematic diagram of a red dot sight having a solar cell.
Figure 5:
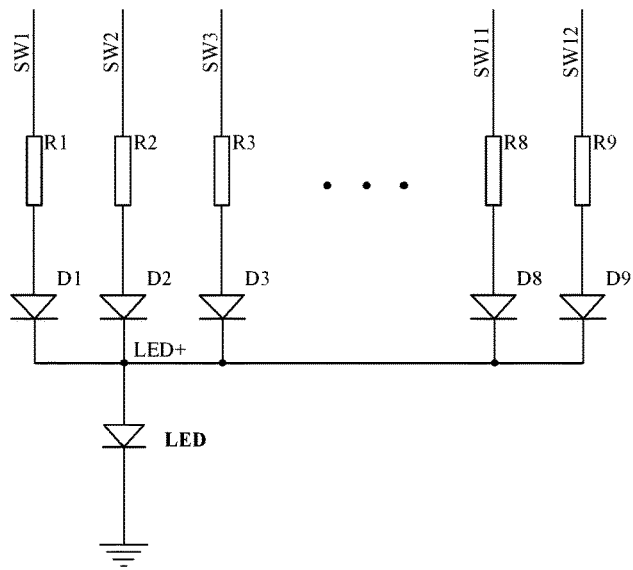
FIG. 5 a schematic circuit diagram of an LED lamp according to an embodiment.

An existing red dot sight merely relies on a battery to supply electric energy, which causes a problem of high use cost. To overcome this problem, this embodiment provides a battery-powered solar red dot sight as shown in FIGS. 4A, 4B and 5, which includes a housing 11, a red dot module placed in or on the housing 11, a battery placed in the housing 11, a brightness regulating switch placed on the housing 11, and a circuit board placed in the housing 11 for controlling a voltage or current of the red dot module. The red dot sight further includes a solar cell 12 placed on the housing 11, wherein a power output terminal of the solar cell 12 is connected to a power input terminal of the red dot module.

In this way, electric energy can be provided to the red dot module by virtue of the solar cell 12 as long as sunlight exists. Thus it is ensured that the red dot module works normally and can adapt to change as the ambient brightness changes. For example, when the ambient brightness is enhanced, the brightness of the output light of the red dot module is correspondingly increased, whereas, the brightness of the output light of the red dot module is weakened as the ambient brightness darkens. This does not need manual operation and thus it is convenient. More importantly, the red dot sight always depends on a battery to supply weak power to the red dot module in the case of daily use, and can be supplemented by the solar cell in an environment of sunlight. The red dot module still can normally work by virtue of battery power supply when environment light is weak or absent.

The circuit board is provided with a micro control unit (MCU) and a gear control circuit. The solar cell is connected in series to the red dot module via the MCU, and the battery is connected in series to the red dot module via the MCU and the gear control circuit. As a press button switch, the brightness regulating switch includes a "+" button and a "−" button, wherein the "+" button and the "−" button are respectively connected to the MCU. The MCU cuts off an electrical connection between the solar cell 12 and the red dot module according to an initial input signal of either one of the "+" button and the "−" button, and controls the gear control circuit according to second or multiple input signals of either one of the "+" button and the "−" button to implement regulation of the voltage or current of the red dot module and change the brightness of output light of the red dot module. Furthermore, the MCU cuts off an electrical connection between the battery and the gear control circuit according to a signal simultaneously inputted via the "+" button and the "−" button or no arbitrary input signal being inputted within a period of time, and simultaneously recovers the electrical connection between the solar cell 12 and the red dot module.

Figure 6:
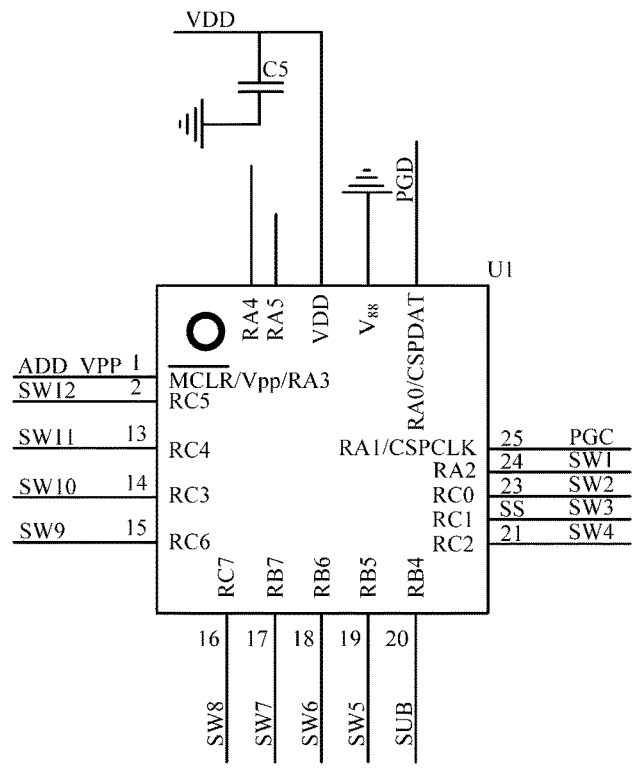
FIG. 6 is a schematic diagram of a processing a chip U1.
Figure 7:
FIG. 7 is a schematic diagram of a switch button S1.
Figure 8:
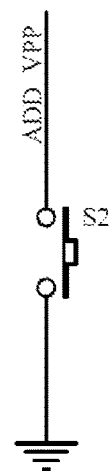
FIG. 8 is a schematic diagram of a switch button S2.
Figure 9:
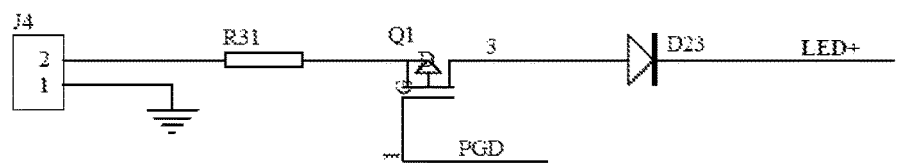
FIG. 9 is a schematic circuit diagram of a power interface.

The LED lamp as shown in FIG. 8 is connected to control pins 24, 23, 22, 21, 13, 14, 15, 16, 17, 18, 19 and 20 corresponding to the processing chip U1 (MCU) as shown in FIG. 6 through a plurality of diodes D1, D2, D3, D4, . . . D8 and D9 connected in parallel. Current-limiting resistors R1, R2, R3, . . . R8 and R9 are connected in series between the diodes D1, D2, D3, D4, . . . D8 and D9 of each branch and the corresponding control pins 24, 23, 22, 21, 13, 14, 15, 16, 17, 18, 19 and 20 of the processing chip U1. The switch buttons S1 ("+" or "−" button) and S2 ("−" or "+" button) as shown in FIG. 7 and FIG. 8 are respectively connected to pins SUB and ADD VPP of the processing chip U1 as shown in FIG. 5, the power source VDD is connected to a power supply pin 18 of the processing chip U1 through a diode D21 via a power interface J3 as shown in FIG. 9 so as to supply power. A filter capacitor C5 is connected in parallel between the diode D21 and the power supply pin 18 of a processing chip U2. Through input signals of the switch buttons S1 and S2, the processing chip U2 selects a branch diode set by conduction so as to change the supply current of LED to implement the adjustment of the brightness of the LED.

Based on traditional battery power supply, in this embodiment, a solar cell power supply circuit is especially added, which works with the battery simultaneously, and can continue supplying power by virtue of the battery in an environment lacking sufficient illumination, without affecting the normal use of the sight.

Figure 10:
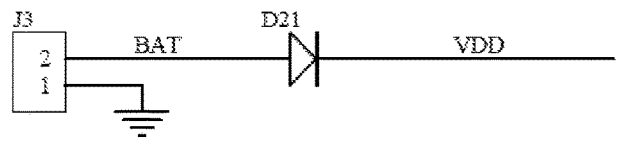
FIG. 10 is a schematic wiring diagram of a solar cell interface.

As shown in FIG. 10, a solar cell interface J4 is connected in series to the LED Lamp through a current-limiting resistor R31, a triode Q1 and a diode D23 to constitute a series loop which depend on the solar cell to supply power in real time, wherein a base electrode of the triode Q1 is connected to a PGD pin of the processing chip U1 to implement the control of the triode Q1.

Figure 11:
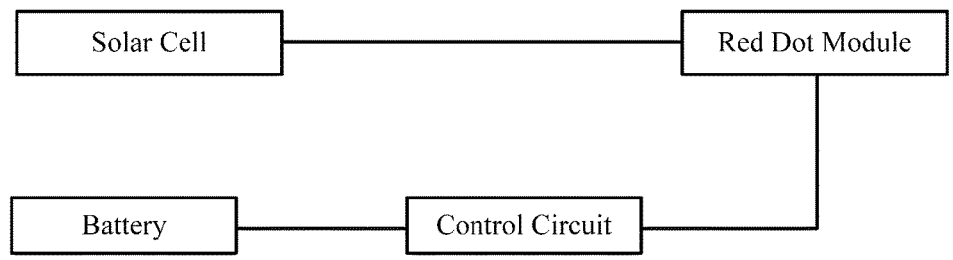
FIG. 11 is a schematic block diagram of a battery-powered solar cell power supply circuit.

Referring to FIG. 11, it is easy to see that the circuit using the solar cell to supply electric energy for a micro-current LED light source, namely, using the solar cell and the battery to supply power, simultaneously drives the red dot module. The battery provides a tiny basic current to the red dot module by controlling the circuit so that the red dot emits faint light, which is visible in a dimly lighted environment at night. When ambient light ray is strengthened, the basic current supplied by the battery does not change, the solar cell supplements a part of current to the red dot module after receiving ambient light so that the brightness of the red dot is increased. The current supplied by the solar cell changes as the ambient light changes. Consequently, the brightness of the red dot module changes as the ambient light changes. In this way, 24-hour continuous operation is implemented, power is supplied by the battery at night, and is supplemented by the solar cell in the day. The electrical quantity consumed by the battery is small, and thus a problem of the service life of the battery does not need to worry. Therefore, the service life of the battery is prolonged and the use cost is reduced.

The solar cell 2 provided by this embodiment is embedded in the top surface of the housing 1 so that the solar cell 12 can receive illumination of sunlight in the longest time with the largest area to provide sufficient and long-time electric energy. To ensure that the solar cell 12 exerts the maximum efficacy, the top surface of the solar cell 12 is provided with protective glass, which may prevent dust from falling and prevent the solar cell 12 from being accidentally scratched.

The solar cell 12 as mentioned in this embodiment may be any one of monocrystalline silicon, polycrystalline silicon, silicon photodiode or weak light type amorphous silicon solar cells.

Figure 12C:
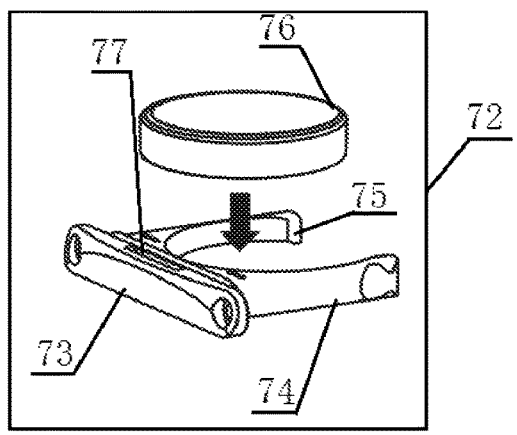
FIG. 12C is a schematic splitting diagram of a battery bracket structure.

As can be seen with reference to FIG. 12B, one side, of the red dot sight, in an axial direction is provided with an extractable battery compartment 71 and a battery bracket 72 in conjunction with the extractable battery compartment 71 for use, as can be seen with reference to FIG. 12C. The battery bracket 72 comprises a push-pull block 73 and a support member 74 fixedly connected to an inner side surface of the push-pull block 73. The support member 74 consists of a left supporting rod and a right supporting rod which are placed symmetrically and whose internal surfaces butt and connect into an integral arc-shaped surface. Free ends of the left supporting rod and the right supporting rod are provided with a projection 75 whose internal surface is an arc-shaped surface, wherein the projection 75 extends inwardly, perpendicular/parallel to the push-pull block 73, to form an annular clamping portion having a notch for clamping the battery 76.

Meanwhile, in order that the whole battery bracket 72 can be conveniently taken out from the battery compartment 71, in this embodiment, a groove 77 is particularly formed on the top of the push-pull block 73. By inserting one end of a pick into the groove 77, the whole battery bracket 72 and the battery 76 clamped thereon can be easily pulled out, so that the whole battery bracket 72 is loosened in the battery compartment 71, and then the whole battery bracket 72 can be pulled out by hands.

Figure 12D:
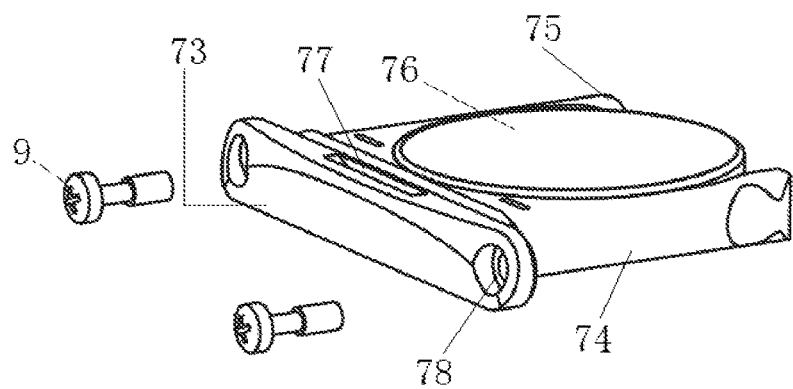
FIG. 12D is a schematic structural diagram of a batter bracket provided with a fastening screw.

To prevent vibration generated in use from causing the battery bracket 72 to loosen or even fall out of the battery compartment 71, thereby having a negative effect on the stability of power supply, in this embodiment, left and right edges of the push-pull block 73 are respectively extended toward the left and the right. Screw holes 78 are formed on the extending portions, screw holes are also formed at corresponding positions of the sight, the threaded fixation of the battery bracket 72 and the sight body is implemented by virtue of screws 79 as shown in FIG. 12D. In this way, stability of installation of the battery bracket 72 is effectively improved and reliability of power supply is ensured.

Figure 15:
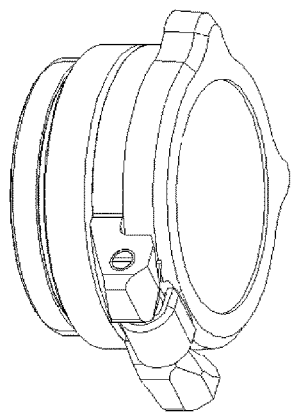
FIG. 15 is a schematic diagram of a dustproof cover.
Figure 16:
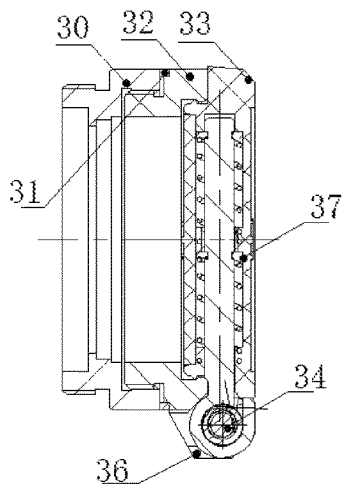
FIG. 16 is a radial sectional view of the dustproof cover.
Figure 17:
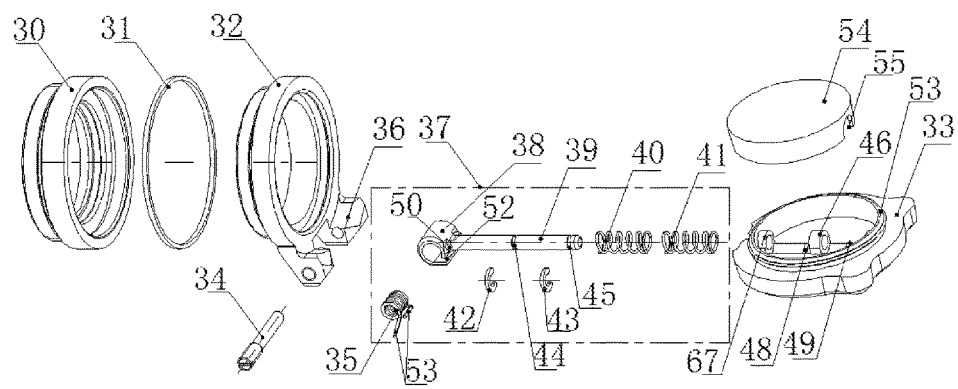
FIG. 17 is a splitting diagram of the dustproof cover.

FIG. 15 shows a dustproof cover placed on a light outlet hole on the housing of the sight, as can be seen with reference to FIG. 16 and FIG. 17, the dustproof cover includes an annular front cover 30, an annular base 32 threadedly coupled to one end of the annular front cover 30, and a cover plate 33 coupled to an ear hole 36 on the annular base 32 through a core shaft 34. A washer 31 is provided between the annular front cover 30 and the annular base 32, and the cover plate 33 is coupled to the ear hole 36 through a support bar 37.

The support bar 37 includes a connecting pipe 38 and a connecting rod 39 coupled to the annular base 32, a first return spring 40 and a second return spring 41 sleeved on the connecting rod 39, and a first clamp spring 42 and a second clamp spring 43. One end of the connecting rod 39 is fixedly connected to a circumferential central portion of the connecting pipe 38. The connecting rod 39 is provided with a central annular groove 44 positioned at an axial central portion of the connecting rod 39 and an end annular groove 45 placed at the other end of the connecting rod 39. A first fixing ring 67, a second fixing ring 46 and a third fixing ring 47 are placed on an internal surface of the cover plate 33 along the same diameter direction of a circle sharing the same plane with the cover plate 33. The second fixing ring 46 is placed at a middle position between the first fixing ring 67 and the third fixing ring 47. On the internal surface of the cover plate 33, a first rectangular groove 48 and a second rectangular groove 49 are placed at a side where the second fixing ring 46 and the third fixing ring 47 face toward the first fixing ring 67.

The connecting rod 39 successively passes through the first fixing ring 67, the second fixing ring 46 and the third fixing ring 47. The first return spring 40 is placed between the first fixing ring 67 and the second fixing ring 46, and the second return spring 41 is placed between the second fixing ring 46 and the third fixing ring 47.

One end of the first clamp spring 42 and of the second clamp spring 43 is respectively inserted into the central annular groove 44 and the end annular groove 45, and the other end thereof is respectively inserted into the first rectangular groove 48 and the second rectangular groove 49, so that the first return spring 40 and the second return spring 41 compressed under the action of external forces restore a static length after the external forces disappear, and meanwhile the connecting pipe 38 tightly presses on an end face of the cover plate 33. On the connecting pipe 38, either side of the connecting rod 39 is provided with a clamping piece 50, the end face of the cover plate 33 is provided with a limit groove 51 fitting in with the clamping piece 50 for limiting.

By pulling the connecting pipe 38, the clamping piece 50 is pulled out from the limit groove 51, and then the cover plate 33 is rotated, so as to implement rotation around the connecting rod 39 at arbitrary angles, including 360°. After the connecting pipe 38 is loosened and the external force is withdrawn, the first return spring 40 and the second return spring 41 restore under the action of the first clamp spring 42 and the second clamp spring 43.

The connecting pipe 38 is internally provided with a torsion spring 35, the core shaft 34 passes through the torsion spring 35, and meanwhile the connecting pipe 38 is provided with an axial opening 52, so that a tail end 53 of the torsion spring 35 extends to outside the connecting pipe 38 and presses against the ear hole 36 to produce a force to open the cover plate 33. In this way, the cover plate 33 can be quickly opened.

The opening 52 is placed at a rear side of the clamping piece 50. The opening 52 and an axle of the connecting rod 39 are respectively placed on two sides of the clamping piece 50.

Figure 18:
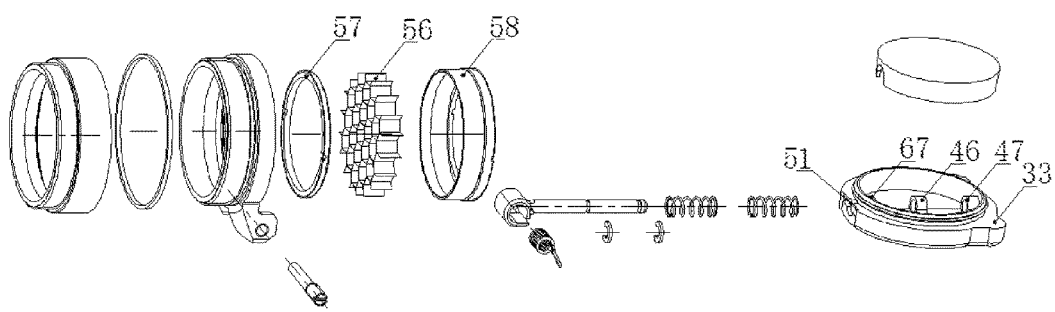
FIG. 18 is a splitting diagram of the dustproof cover additionally provided with a honeycomb seal.

As can be seen from FIG. 18, the internal surface of the cover plate 33 is provided with an annular retainer ring 53. The first fixing ring 67 and the second fixing ring 46 are respectively embedded into the annular retainer ring 53. A sealing cap 54 threadedly coupled to the annular retainer ring 53 is further provided. A position, corresponding to the first fixing ring 67, on the sealing cap 54 is provided with a notch 55 into which the connecting rod 39 can be inserted.

To allow the dustproof cover to be mounted on a light outlet hole of the sight, in this embodiment, an embedded honeycomb seal (as shown in FIG. 18) threadedly coupled to the annular base 32 is added on the basis of the dustproof cover. The honeycomb seal and the annular front cover 30 are respectively placed at two axial ends of the annular base 32. The honeycomb seal includes a circular honeycomb network 56, an annular honeycomb network housing 57 and an annular clamping ring 58. An internal surface of the annular honeycomb network housing 57 is provided with an annular flange. The circular honeycomb network 56 is embedded into the annular honeycomb network housing 57, and is fixed to the annular honeycomb network housing 57 via the annular flange and the annular clamping ring 58 threadedly coupled to the annular honeycomb network housing 57. By means of the honeycomb seal, lens may be effectively prevented from reflecting light, and the LED light source may be sheltered, so that a possibility of being perceived may be prevented. Therefore, invisibility and safety may be improved.

Figure 19:
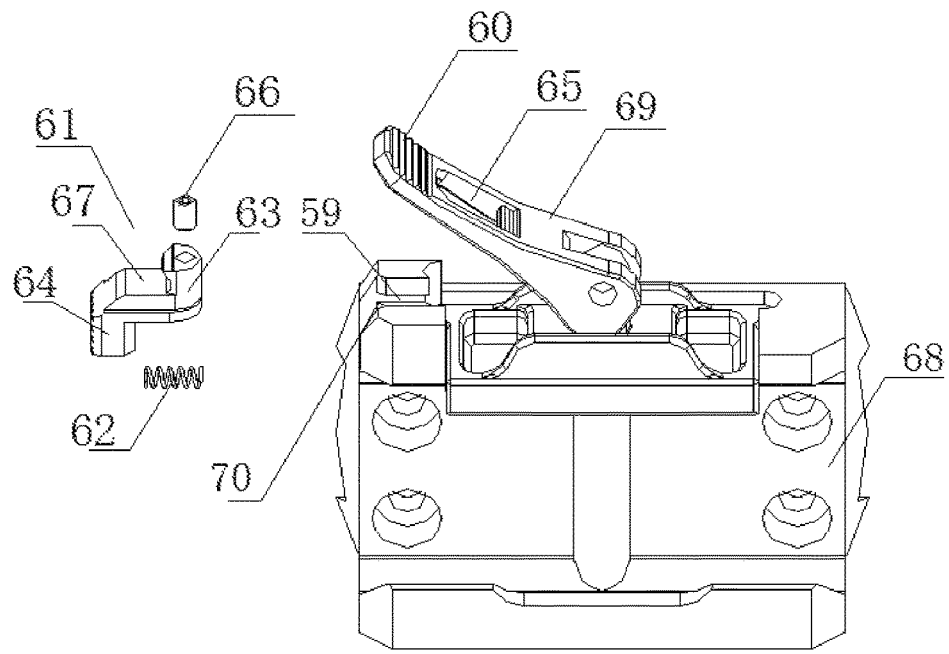
FIG. 19 is a schematic diagram of an installation card track.
Figure 20:
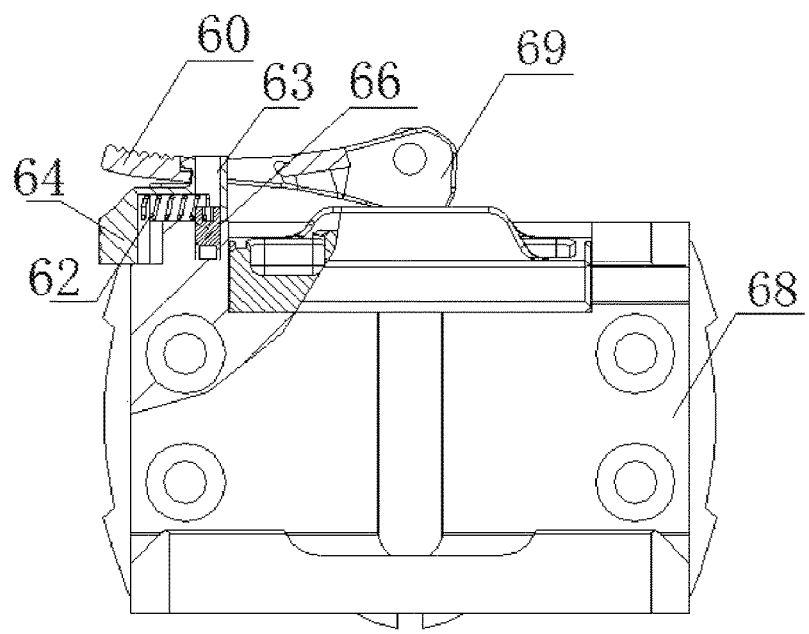
FIG. 20 is a partial sectional view of the installation card track.

FIG. 19 and FIG. 20 show an installation card track in conjunction with the red dot sight for use (as shown in FIG. 4B, the red dot sight is mounted on the installation card track), which includes a base 68, a cam handle 69 mounted at one lateral surface of the base, and a locking mechanism fixing the cam handle 69. The locking mechanism includes a card track portion 70, a sliding lock catch 61 clamped into the card track portion 70 and a lock catch return spring 62. The card track portion 70 is placed at a rear end of the base 68, and a parallel track opening 59 of the card track portion 70 is parallel to a lateral surface of the base 68.

The sliding lock catch 61 includes a straight connecting portion 67 parallel to a bottom surface (parallel to the lateral surface of the base 68) of the card track portion 70, an internally vertical portion 63 and an externally vertical portion 64 perpendicular to the bottom surface of the card track portion 70. The internally vertical portion 63 and the externally vertical portion 64 are respectively connected to two ends of the straight connecting portion 67.

With reference to FIG. 20, the lock catch return spring 62 is placed in space surrounded by lateral surfaces and bottom surfaces of the externally vertical portion 64 and the card track portion 70 and the straight connecting portion 67, and the lock catch return spring 62 is axially parallel to the lateral surface of the base 68.

An outer side edge at a top of the internally vertical portion 63 is provided with an arc-shaped guide surface, and a rear end edge of the arc-shaped guide surface extends to the externally vertical portion 64 to form a hook portion so that a locking notch 65 on the cam handle 69 can be inserted or drawn out to implement or relieve limit and fixation of the cam handle 69. The internally vertical portion 63 is vertically fixed to the straight connecting portion 67 by a pin bolt 66. Specifically, a screw hole is formed downward at the top of the internally vertical portion 63, and a corresponding position of the straight connecting portion 67 is provided with a screw hole, so that fixed connection can be implemented through a pin 66.

This installation card track differs from the existing installation card track in that the sliding lock catch 61 is pushed toward a cam portion of the cam handle 69 when the cam handle 69 is opened, so that the arc-shaped guide surface of the internally vertical portion 63 is far away from the rear edge of the locking notch 65 on the cam handle 69, the hook portion may be separated from the locking notch 65, and limit release of the cam handle 69 may be implemented by upwardly pushing the tail end of the cam handle 69 (namely a trigger portion 60 of the free end). Compared with the traditional manner of pulling back to open the locking notch, by using this operation manner, when locking limit is contacted, it is only needed to forwardly push the sliding lock catch 61, while when locking limit is released, it is only needed to fasten the cam handle so that the locking notch 65 of the cam handle is guided in so as to fit in with the arc-shaped guide surface of the read end at the top of the internally vertical portion 63. This operation meets operation habits of a person, has the advantage of convenient operation and is beneficial to rapid operation.

Figure 21:
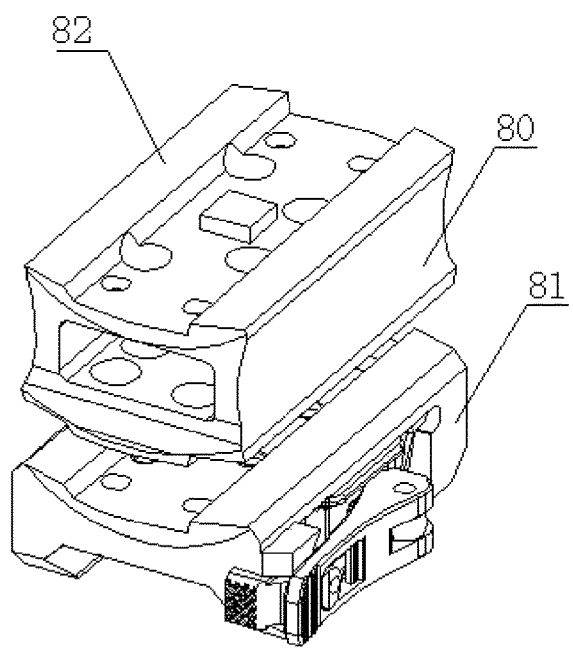
FIG. 21 is a schematic diagram of the installation card track provided with a card track pad.
Figure 22:
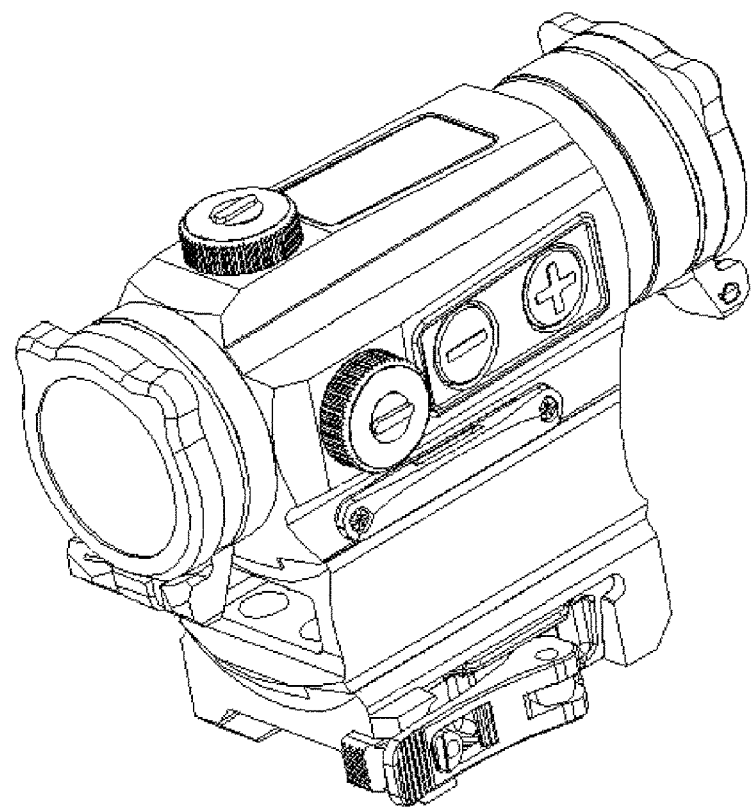
FIG. 22 is a schematic diagram illustrating that the red dot sight is mounted on the installation card track through the card track pad.

To adapt to a requirement for height adjustment of the sight, this embodiment provides a card track pad 80 (as shown in FIG. 21) which is fit in with the installation card track 81. The card track pad 80 is composed of a top plate, a bottom plate, and a left side plate and a right side plate which are respectively connected to the left and right corresponding ends of the top plate and the bottom plate. The card track pad 80 is fixedly connected to the installation card track 81 through screws, and the top surface of the card track pad 80 is provided with a guide rail 82 which is matched and clamped with the sight. By means of the card track pad 80, the height of the sight can be increased. Specifically, the card track pad 80 is fixedly mounted on the top surface of the installation card track 81, and then the sight is clamped on the top surface of the card track pad 80 through the guide rail 82, just as shown in FIG. 22.

Exemplary embodiments of the present disclosure have been particularly illustrated and described as above. It is to be understood that the disclosure is not limited to the disclosed embodiments, but rather that the disclosure is intended to cover various modifications and equivalent permutations that are encompassed within the scope of the appended claims.

What is claimed is:

1. A red dot sight provided with a light emitting diode (LED) light source comprising a point light source and a peripheral light source around the point light source, the peripheral light source being a discontinuous line light source, said red dot sight comprising:
a housing; and
a dustproof cover placed on a light outlet hole on the housing, the dustproof cover comprising:
an annular front cover,
an annular base threadedly coupled to one end of the annular front cover,
a cover plate coupled to an ear hole on the annular base through a core shaft, and
a washer provided between the annular front cover and the annular base, wherein
the cover plate is coupled to the ear hole through a support bar;
the support bar comprises:
a connecting pipe and a connecting rod coupled to the annular base,
a first return spring and a second return spring sleeved on the connecting rod, and
a first clamp spring and a second clamp spring;
one end of the connecting rod is fixedly connected to a circumferential central portion of the connecting pipe;
the connecting rod is provided with a central annular groove positioned at an axial central portion of the connecting rod and an end annular groove placed at another end of the connecting rod;
a first fixing ring, a second fixing ring, and a third fixing ring are placed on an internal surface of the cover plate along a same diameter direction of a circle sharing a same plane with the cover plate;
the second fixing ring is placed at a middle position between the first fixing ring and the third fixing ring;
on an internal surface of the cover plate, a first rectangular groove and a second rectangular groove are placed at a side where the second fixing ring and the third fixing ring face toward the first fixing ring;
the connecting rod successively passes through the first fixing ring, the second fixing ring, and the third fixing ring;
the first return spring is placed between the first fixing ring and the second fixing ring, and the second return spring is placed between the second fixing ring and the third fixing ring;
one end of the first clamp spring and of the second clamp spring is respectively inserted into the central annular groove and the end annular groove, and another end of the first clamp spring and of the second clamp spring is respectively inserted into the first rectangular groove and the second rectangular groove, so that the first return spring and the second return spring compressed under an action of external forces restore a static length after the external forces disappear, and meanwhile the connecting pipe tightly presses on an end face of the cover plate; and
on the connecting pipe, either side of the connecting rod is provided with a clamping piece, the end face of the cover plate is provided with a limit groove fitting in with the clamping piece for limiting.

2. The red dot sight according to claim 1, wherein the connecting pipe is internally provided with a torsion spring, and the core shaft passes through the torsion spring;
the connecting pipe is provided with an axial opening so that a tail end of the torsion spring extends to outside the connecting pipe and presses against the ear hole to produce a force to open the cover plate; and the opening is placed at a rear side of the clamping piece, and the opening and an axle of the connecting rod are respectively placed on two sides of the clamping piece.

3. The red dot sight according to claim 1, wherein the internal surface of the cover plate is provided with an annular retainer ring, the first fixing ring and the second fixing ring are respectively embedded into the annular retainer ring; the internal surface of the cover plate is further provided with a sealing cap threadedly coupled to the annular retainer ring; and a position, corresponding to the first fixing ring, on the sealing cap is provided with a notch into which the connecting rod can be inserted.

4. The red dot sight according to claim 1, further comprising an embedded honeycomb seal threadedly coupled to the annular base, the honeycomb seal and the annular front cover are respectively placed at two axial ends of the annular base;
wherein the honeycomb seal comprises a circular honeycomb network, an annular honeycomb network housing, and an annular clamping ring;
wherein an internal surface of the annular honeycomb network housing is provided with an annular flange; and
wherein the circular honeycomb network is embedded into the annular honeycomb network housing, and is fixed to the annular honeycomb network housing via the annular flange and the annular clamping ring threadedly coupled to the annular honeycomb network housing.

5. The red dot sight according to claim 4, wherein the internal surface of the cover plate is provided with an annular retainer ring;
the first fixing ring and the second fixing ring are respectively embedded into the annular retainer ring;
a sealing cap threadedly coupled to the annular retainer ring is further provided; and
a position, corresponding to the first fixing ring, on the sealing cap is provided with a notch into which the connecting rod can be inserted.

6. An installation card track mounted in the red dot sight according to claim 1, comprising:
a base,
a cam handle mounted at one lateral surface of the base, and
a locking mechanism fixing the cam handle, wherein the locking mechanism comprises a card track portion, a sliding lock catch clamped into the card track portion and a lock catch return spring;
wherein the card track portion is placed at a rear end of the base, and a parallel track opening of the card track portion is parallel to a lateral surface of the base;
the sliding lock catch comprises a straight connecting portion parallel to a bottom surface of the card track portion, an internally vertical portion, and an externally vertical portion perpendicular to the bottom surface of the card track portion;
the internally vertical portion and the externally vertical portion are respectively connected to two ends of the straight connecting portion;
the lock catch return spring is placed in space surrounded by the externally vertical portion, a lateral surface and the bottom surface of the card track portion, and the straight connecting portion, and the lock catch return spring is axially parallel to the lateral surface of the base;

an outer side edge at a top of the internally vertical portion is provided with an arc-shaped guide surface, and a rear end edge of the arc-shaped guide surface extends to the externally vertical portion to form a hook portion so that a locking notch on the cam handle can be inserted or drawn out to implement or relieve limit and fixation of the cam handle; and the internally vertical portion is vertically fixed to the straight connecting portion by a pin bolt.

7. The red dot sight according to claim 1, wherein one side, of the red dot sight, in an axial direction is provided with an extractable battery compartment and a battery bracket in conjunction with the extractable battery compartment for use,
the battery bracket comprises a push-pull block and a support member fixedly connected to an inner side surface of the push-pull block,
the support member comprises a left supporting rod and a right supporting rod which are placed symmetrically and whose internal surfaces butt and connect into an integral arc-shaped surface,
free ends of the left supporting rod and the right supporting rod are provided with a projection whose internal surface is an arc-shaped surface, the projection extends inwardly, perpendicular/parallel to the push-pull block, to form an annular clamping portion for clamping a notch of a battery.

8. The red dot sight according to claim 7, wherein a top of the push-pull block is provided with a groove for drawing the battery bracket from the battery compartment.

9. The red dot sight according to claim 8, wherein left and right edges of the push-pull block (73) respectively extend leftward and rightward, and the extending portions are respectively provided with a screw hole (78) threadedly connected to the red dot sight.

10. The red dot sight according to claim 1, wherein a radial cross section of the peripheral light source is ring-shaped.

11. The red dot sight according to claim 10, wherein along a circumferential direction of the peripheral light source there are uniformly provided with four strip light sources extending from an edge of the peripheral light source to an outer side edge of the peripheral light source.

12. The red dot sight according to claim 11, wherein at a bottom of the peripheral light source, there is provided a notch that is symmetrical with respect to a diameter in a vertical direction, at a bottom of the notch there is provided a horizontal segment that is symmetrical with respect to a diameter in the vertical direction, wherein a left side and a right side of the horizontal segment intersect with extension lines of segmental arcs at two sides of the notch;
a bottom strip light source, among the strip light sources, placed at the bottom of the peripheral light source is perpendicular to the horizontal segment and bisects the horizontal segment; and
on the horizontal segment, a left side and a right side of the bottom strip light source are respectively provided with at least two light emitting bars perpendicular to the horizontal segment.

13. The red dot sight according to claim 1, wherein a plurality of the point light sources are placed vertically downward and uniformly from a center of the peripheral light source, and the plurality of the point light sources are configured to be respectively lit or simultaneously lit.

14. The red dot sight according to claim 1, wherein the point light sources and the peripheral light source are placed on a same radial plane.

15. The red dot sight according to claim 1, wherein a red dot module is placed in or on the housing, a battery is placed in the housing, a brightness regulating switch is placed on the housing, and a circuit board is placed in the housing for controlling a voltage or current of the red dot module, the battery being connected to the red dot module via the brightness regulating switch;
- the red dot sight further comprises a solar cell placed on the housing, a power output terminal of the solar cell being connected to a power input terminal of the red dot module; and
- the LED light source is installed in the red dot module to provide a light source.

16. The red dot sight according to claim 15, wherein the circuit board is provided with a micro control unit (MCU) and a gear control circuit;
- the solar cell is connected in series to the red dot module via the MCU, and the battery is connected in series to the red dot module via the MCU and the gear control circuit;
- as a press button switch, the brightness regulating switch comprises a "+" button and a "−" button, and the "+" button and the "−" button are respectively connected to the MCU; and
- the MCU is configured to cut off an electrical connection between the solar cell and the red dot module according to an initial input signal of either one of the "+" button and the "−" button, control the gear control circuit according to second or multiple input signals of either one of the "+" button and the "−" button to implement regulation of the voltage or current of the red dot module, change the brightness of output light of the red dot module; and is configured to cut off an electrical connection between the battery and the gear control circuit according to a signal simultaneously inputted via the "+" button and the "−" button or no arbitrary input signal being inputted within a period of time, and simultaneously recover the electrical connection between the solar cell and the red dot module.

17. The red dot sight according to claim 15, wherein the solar cell is pit mounted on a top surface of the housing, and a top surface of the solar cell is provided with protective glass.

18. The red dot sight according to claim 15, further comprising at least one additional solar cell, and a length direction of the solar cells is parallel to that of the housing.

19. The red dot sight according to claim 15, wherein the solar cell is any one of monocrystalline silicon, polycrystalline silicon, silicon photodiode, or weak light type amorphous silicon solar cells.

20. The red dot sight according to claim 1, further comprising an inner core housing whose front end external surface is a spherical surface, a red dot module mounted in the inner core housing, and a spherical clamping ring mounted at a front end front side of the inner core housing to limit the front end, wherein the LED light source is mounted in the red dot module to provide a light source;
- wherein an external surface at the front end of the inner core housing is provided with a limit pin, and the limit pin extends outward parallel to a radial direction along an extension line of a spherical center line of the front end; and
- wherein a front end rear side of the inner core housing is provided with an annular fixed base whose internal surface is a spherical surface fitting to a surface of the front end rear side, and an edge at the front end of the annular fixed base is provided with a U-shaped notch extending inward from the front end edge so that the limit pin is inserted into the U-shaped notch to limit the inner core housing.

* * * * *